(12) United States Patent
De Angelis (10) Patent No.: US 10,766,741 B2
(45) Date of Patent: Sep. 8, 2020

(54) MONITORING OF CONVEYANCE SYSTEM

(71) Applicant: Inventio AG, Hergiswil (CH)

(72) Inventor: Claudio De Angelis, Münster (DE)

(73) Assignee: INVENTIO AG, Hergiswil NW (CH)

( * ) Notice: Subject to any disclaimer, the term of this patent is extended or adjusted under 35 U.S.C. 154(b) by 284 days.

(21) Appl. No.: 15/578,327

(22) PCT Filed: May 25, 2016

(86) PCT No.: PCT/EP2016/061732
§ 371 (c)(1),
(2) Date: Nov. 30, 2017

(87) PCT Pub. No.: WO2016/193077
PCT Pub. Date: Dec. 8, 2016

(65) Prior Publication Data
US 2018/0148298 A1 May 31, 2018

(30) Foreign Application Priority Data
Jun. 2, 2015 (EP) .................................... 15170254

(51) Int. Cl.
*B66B 5/00* (2006.01)
*B66B 25/00* (2006.01)
(Continued)

(52) U.S. Cl.
CPC ............ *B66B 5/0006* (2013.01); *B66B 3/002* (2013.01); *B66B 5/0025* (2013.01);
(Continued)

(58) Field of Classification Search
CPC ....... B66B 5/0025; B66B 27/00; B66B 3/002; B66B 5/0006; B66B 25/006;
(Continued)

(56) References Cited

U.S. PATENT DOCUMENTS 6,477,485 B1 11/2002 Radulovic et al.
2003/0217894 A1 11/2003 Perala et al.
(Continued)

FOREIGN PATENT DOCUMENTS

| CN | 101624159 A | 1/2010 |
|---|---|---|
| CN | 102190239 A | 9/2011 |

(Continued)

*Primary Examiner* — Mischita L Henson
(74) *Attorney, Agent, or Firm* — William J. Clemens; Shumaker, Loop & Kendrick, LLP (57) ABSTRACT

A method for monitoring a conveying system with a monitoring device includes recording a signal pattern progression in relation to a functional unit of the conveying system. A reference signal progression is stored in a database as is a correlation data set for the reference signal progression, the correlation data set including instants or time segments in the reference signal progression and reference to the functional unit. The reference is linked to each instant or time segment, the recorded signal pattern progression is compared with the reference signal progression by a processing unit, and in the event of deviation between the signal progressions an entry in the correlation data set belonging to the reference signal progression is determined by the processing unit on the basis of an instant or time segment of such a deviation, and the functional unit referenced there is output as a cause.

15 Claims, 6 Drawing Sheets

(51) Int. Cl.
*B66B 27/00* (2006.01)
*G05B 23/02* (2006.01)
*B66B 3/00* (2006.01)

(52) U.S. Cl.
CPC ............ *B66B 25/006* (2013.01); *B66B 27/00* (2013.01); *G05B 23/0278* (2013.01); *G05B 2219/2621* (2013.01); *G05B 2219/2659* (2013.01)

(58) Field of Classification Search
CPC ........ G05B 23/0278; G05B 2219/2621; G05B 2219/2659
See application file for complete search history.

(56) References Cited

U.S. PATENT DOCUMENTS

2010/0094798 A1   4/2010   Shudo et al.
2011/0240414 A1   10/2011   Carreno et al.

FOREIGN PATENT DOCUMENTS

| | | | |
|---|---|---|---|
| DE | 20218477 U1 * | 3/2003 | ............. B66B 27/00 |
| DE | 102011009362 A1 | 8/2011 | |
| EP | 1050503 A1 | 11/2000 | |
| WO | 0236476 A1 | 5/2002 | |
| WO | 2014200457 A1 | 12/2014 | |

* cited by examiner

26 MEMORY
40 SIGNAL PATTERN PROGRESSION
44 REFERENCE SIGNAL PROGRESSION
50 DATABASE
52 DATA SET
54 CORRELATION DATA SET

28 COMPUTER PROGRAM
29 PROCESSOR
40 SIGNAL PATTERN PROGRESSION
44 REFERENCE SIGNAL PROGRESSION
52 DATA SET
54 CORRELATION DATA SET

MONITORING OF CONVEYANCE SYSTEM

FIELD

The present invention relates to a method for monitoring a conveying system, a monitoring device, and a conveying system for performing said method.

BACKGROUND

The invention relates to a method for monitoring a conveying system, i.e., for example, an elevator system, an escalator, a moving walkway, or the like, wherein, in the interest of improving the readability of the following description, the term "conveying system" is used hereinafter as a generic term for an elevator system, an escalator, or a moving walkway, and accordingly such specific conveying systems are to be understood as also being included at all times. The invention also relates to a device—also referred to hereinafter as a monitoring device—for monitoring and/or diagnosing such a conveying system according to the monitoring method, and a conveying system that is governed and configured in order to execute the method.

Methods and corresponding devices for monitoring elevator systems and the like are known per se. DE 10 2011 009 362 A discloses a method for monitoring an escalator. Therein, recorded operational sound data is compared with normal sound data. Thus, an operational sound is determined to be normal, for example, when the sound volume thereof lies in a range predetermined for the normal state, and regarded as abnormal when above or below this range.

WO 2014/200457 A discloses a method for monitoring an elevator system that is also based on capturing of sound data during operation of the elevator system. Therein, sound data is recorded at different instants, and a comparison should reveal changes. Recognized changes over time in the sound data are then used to output preventive maintenance instructions. Moreover, any fault situations should also be recognizable on the basis of the presence or absence of noise in the respective recorded sound data.

These approaches leave room for improvement insofar as, in the best case, an existing or imminent fault situation can be recognized thereby but without specific indications of a particular cause being given.

DE 10 2011 009 362 A, seemingly complementarily in that regard, proposes simultaneously collecting sound data with respect to a fixed part and movable part of the conveyor belt. Then, an indication of a fault cause should be given on the basis of a comparison of the sound data. This seems to require that the sound data be recorded when the movable part is moving past the fixed part, and that the sound data in this moment be sufficiently characteristic to recognize a fault. These conditions seem to allow only the detection of very specific fault situations.

US 2011/0240414 A1 proposes a system for monitoring an elevator, wherein signals of the elevator—e.g., a sound progression—are outputted in conjunction with operational data and a reference signal progression of the elevator. This data is made available to a service representative or an expert for diagnosis upon discovery of a relevant deviation.

US 2010/0094798 A1 likewise proposes a monitoring method for monitoring an escalator, wherein, in the presence of relevant sound differences from a reference sound progression, a frequency analysis is performed and a cause, such as a contamination or a stripping of parts, can be specified on the basis of the frequency analysis.

EP1050503 discloses a help system for elevators which involves checking to what extent an elevator follows an expected model progression or to what extent possible hypothetical faults occur.

SUMMARY

These solutions only allow detection of precisely predetermined events or still require considerable manual effort in the analysis of data. The present invention addresses the problem of setting forth a method and device working in accordance with said method that make it easy not only to recognize an already-given or imminent fault or other exceptional situation, but also to likewise output a potential fault cause.

This problem is solved according to the invention by means of a method for monitoring a conveying system, in particular, an elevator system, and by means of a device for carrying out the features of the method. The method for monitoring a conveying system therefore provides recording at least one signal pattern progression in relation to the conveying system, storing at least one reference signal progression in a database for the signal pattern progression, and storing a correlation data set for the or each reference signal progression in the database. The correlation data set comprises data in relation to instants or time segments in the reference signal progression, and references to at least one functional unit encompassed by the conveying system, which references are linked to each instant or time segment. To monitor the conveying system, the recorded signal pattern progression is compared with the reference signal progression by means of a device provided therefor, e.g., by a monitoring device. In the event of deviations between the signal pattern progression and the reference signal progression, a suitable entry in the correlation data set belonging to the reference signal progression is determined by means of the respective device on the basis of an instant or time segment of such a deviation, and the functional unit referenced there is output as a cause.

The correlation data set may be constructed so as to be suitable for the system on entry into service of the conveying system. For this purpose, for example, the reference signal progression is recorded and stored. In the reference signal progression, distinctive signal events are marked and corresponding causes are assigned. In the correlation data set, the time windows belonging to the distinctive signal events are entered together with the causes. For the sake of simplicity, the manufacturer of the conveying system may provide a standard correlation table that contains a chronological order of characteristic signal events and the corresponding causes. On entry into service, the standard correlation table may be adapted and stored as a correlation data set.

The advantage of the invention is that method proposed not only makes it possible to recognize any possible present or imminent fault or other exceptional situation in the conveying system, but also makes it possible to additionally output a cause or potential cause, so that maintenance personnel can directly and selectively check individual functional units of the conveying system on the basis of the output of the inspection method, and, if necessary, maintain or replace or prepare for replacement.

Another advantage of the invention is that little to no intervention in the respective conveying system is necessary for an application of the method, so that a corresponding equipment of the conveyor system and even retrofitting can be done easily and inexpensively. Signal pattern progressions may be recorded by means of microphones or other sensors installed in the conveying system, e.g., vibration sensors. Typical signal pattern progressions are consequently noise signal progressions or sound pattern progressions, which can be recorded via microphones, or vibrations or structure-borne sound, which can be recorded via acceleration sensors. Signals in the form of noise in an electrical or electronic circuit may also be recorded and analyzed. The processing of a recorded signal pattern progression, comparison with a stored reference signal progression, and accessing of a correlation data set and data for potential causes that is stored there may be carried out by means of a monitoring device in the form of a standard computer. A recorded signal pattern progression may be transmitted to such a computer in a wired manner, or also wirelessly, so that, for example, in the event of retrofitting, no additional wiring in the conveying system is required. A usually already-existing control device provided for controlling and/or monitoring the conveying system may be used, but a device independent therefrom may also be used. It would even be conceivable for a mobile device individually carried by maintenance personnel—e.g., a mobile device in the form of a laptop, or in the form of increasingly powerful tablet computers, smartphones, or the like—to be used as the monitoring device.

The comparison of the signal pattern progression with a reference signal progression also need not necessarily be executed locally at the place of the particular conveying system. Rather, the assessment may also be carried out by means of a device—i.e., for example, a computer—that is located at a location of the manufacturer of the conveying system or a location of a company entrusted with the maintenance of the conveying system. Signal pattern progressions recorded during operation may then be transmitted from the particular conveying system electronically, with conventional telecommunications services, for example, as actual sound data via telephone lines or as a component of an email or the like via data lines. A plurality of conveying systems may be monitored by means of such a device.

In one embodiment of the monitoring method, the signal pattern progression is preferably recorded automatically at predetermined or predeterminable instants, and the comparison of the signal pattern progression with the associated reference signal progression and—in the event of a deviation—the subsequent outputting of a functional unit as the causer is preferably also performed automatically and also at predetermined or predeterminable times, for example, following the recording of the signal pattern progression, synchronously or asynchronously with the recording of the signal pattern progression.

The term "predefined or predefinable instants" also means a fixed point in time or fixed points in time, or instants resulting from regular monitoring intervals, as well as instants which are related to the operation of the conveying system. In the case of the latter, the respectively resulting instants at which the monitoring is carried out are predetermined by an event or a state of the particular conveying system. With the occurrence of the particular event or with the achievement of the particular state, the monitoring is prefer-ably triggered automatically. As an example of such an event, in the case of a conveying system in the form of an elevator system, the actuation of an operating element or the generation of a start command triggered thereby can be used to execute an elevator journey. The elevator journey taking place after the event is then detected completely or partially in the form of the signal pattern progression, which can finally be evaluated with regard to an associated reference signal progression. As an example of such a state, a specific switching state of switching elements of the control of the conveying system apply. Based on such a state, a necessary follow-up state results due to the system functionality of the conveying system. The transition from the triggering state to the follow-up state is then detected in whole or in part in the form of the signal pattern progression, and this too can finally be evaluated with regard to an associated reference signal progression.

The expression "synchronously" specifies alternatively that the comparison and outputting occur substantially parallel to the recording of the signal pattern progression. Although the synchronous comparison of the signal pattern progression with the associated reference signal progression and, in the event of a deviation, the subsequent output of a functional unit as the cause generally requires greater computer power, there is an advantage in that the result of the comparison and a cause of a possible deviation between the signal pattern progression and the reference signal progression are available very quickly, namely, immediately after the end of recording the signal pattern progression.

The expression "asynchronously" specifies alternatively that the comparison and outputting occur with a delay with respect to the recording of the signal pattern progression.

The asynchronous execution of the comparison of the signal pattern progression with the associated reference signal progression and, in the event of a deviation, the subsequent output of a functional unit as the cause can be considered, for example, if the respectively recorded signal pattern progression is evaluated, for example, by means of a mobile device carried by a maintenance specialist, such as, for example, a laptop, smartphone or tablet computer. The maintenance specialist is not necessarily permanently with the respective mobile device at the location of the particular conveying system, so that a recorded signal pattern progression or recorded signal pattern progressions are initially buffered locally, for example, in a memory of a control device of the conveying system, and transferred from there for further evaluation to a memory of the mobile device. This can be done, for example, by an external retrieval if the mobile device is connected to the monitoring device or comes into a reception range of a transmitter connected to the monitoring device for wireless transmission of such data, or if the transmission is called up by the user of the device. Furthermore, the external retrieval comes into consideration, for example, if the respectively recorded signal pattern progression is to be evaluated by means of monitoring device of the conveying system, but outside normal peak hours when the conveying system is being used. In addition, the variant of the method outlined above may also be considered if the evaluation is carried out by means of a device located, for example, at a location of the manufacturer of the conveying system or a location of a company entrusted with the maintenance of the conveying system, i.e., for example, a computer in a maintenance center, and a recorded signal pattern progression or recorded signal pattern progressions are transmitted therefor on request, for example, according to a predetermined or predeterminable time grid and with telecommunications means. The data transmitted to the mobile device or the device in the maintenance center comprises either a respectively currently recorded signal pattern progression or a respectively currently recorded signal pattern progression as well as the associated reference signal progression and the correlation data set. A preferred embodiment provides that at least the reference signal progression or the reference signal progression and the correlation data set is already stored in the respective device, so that only the current signal pattern progression or each signal pattern progression since the last retrieval is transmitted. The transmission of the signal pattern progression can also be time-controlled as an alternative to external retrieval if signal progressions recorded at predetermined instants are transmitted, for example, to the maintenance center. Alternatively, the transmission of the signal pattern progression may also be synchronous or asynchronous to the recording of the signal pattern progression. This makes it possible to optionally run a manual or automatic monitoring process.

A signal pattern progression may change over time. Thus, for example, a signal strength—for example, a noise level of a particular functional unit—may decrease during a run-in period of the conveying system. Following this run-in period, this signal strength may remain at a low level for a longer time and then increase again as wear increases. If the signal strength is detected repeatedly, a rate of change may be determined as a change in the signal strength of a specific functional unit over a predetermined period of time.

This leads to a further embodiment of the monitoring method. In this case, at least one recorded signal pattern progression is stored as an additional reference signal progression. When a newly recorded signal pattern progression is being compared with a plurality of reference signal progressions, namely at least the reference signal progression and at least one additional reference signal progression, a rate of change exceeding a predetermined or predeterminable limit value is evaluated then as a deviation between the signal pattern progression and the at least two reference signal professions. In addition, the rates of change arising from the deviation between the plurality of reference signal progressions may of course be compared with each other, with consideration given of course to a time sequence. The consideration of a rate of change and preferably a change in the rate of change is advantageous in that even normal wear can be taken into account in such a way as not to unnecessarily lead to an error message. Optionally, in addition to a consideration of the rate of change in this embodiment of the monitoring method, the simultaneous monitoring of an exceeding of predetermined limit values is provided so that an error message is reliably triggered if the wear corresponds to the limit value. The limit value for the rate of change of a specific functional unit may be stored in the correlation data set.

In embodiments of the monitoring method, a sound pattern progression or a chronological progression of vibrations or structure-borne sound is recorded as the signal pattern progression. A signal pattern progression in the form of a sound pattern progression can be detected particularly easily by means of a microphone which then functions as a signal recording device. A signal pattern progression in the form of recorded vibrations or structure-borne noise can also be detected comparatively easily with a corresponding sensor system. In any case, such sensors or microphones are easy to install in and on the conveying system, do not interfere with or affect the operation thereof, and are also very inexpensive and suitable for wirelessly transmitting the respectively recorded data.

The aforementioned problem is also solved by means of a monitoring device functioning as a device for performing the method. The monitoring device is characterized by comprising means for carrying out the method as described here and below, and insofar as the term "automatic" is used here or hereinbelow, this is to be understood as meaning that the particular action is performed by the respective monitoring device or at least under the control thereof. The aforementioned means are a processing unit in the form of or in the manner of a processor, preferably a microprocessor, a memory and a computer program that can be loaded into the memory and functions as a control program, as well as a comparator, in particular, a comparator implemented in software and thus as a partial functionality of the computer program, for evaluating a recorded signal pattern progression by comparison with at least one reference signal progression and identifying a cause in the event of deviations. A control device, such as is commonly already provided for controlling the particular conveying system, may function as the monitoring device. The implementation of the method and optionally individual embodiments is then an additional functionality of the control device. However, a stand-alone device may also act as a monitoring device, for example, a device which is installed in addition to the control device at the location of the conveying system, or a mobile device or a device at the location of a maintenance center, as described above.

The invention is therefore on the one hand also a computer program with program code means in order to perform all the steps of the method as described here and below when the computer program is executed on a monitoring device intended to automatically monitor a conveying system, and, on the other hand, a storage medium having such a computer program, i.e., a computer program product with program code means, and finally also a device functioning as a monitoring device, in the memory of which such a computer program is loaded or can be loaded as means for carrying out the method and the embodiments thereof.

The invention is finally also a conveying system having at least one signal recording device for recording a signal pattern progression in relation to the conveying system, as well as a monitoring device as described here and hereinbelow, wherein a recorded signal pattern progression is stored or can be stored in a memory encompassed by the monitoring device or accessible by the monitoring device, wherein at least one reference signal progression is stored in a database, wherein a correlation data set is stored in the database for the or each reference signal progression, wherein the correlation data set comprises instants or time segments in the reference signal progression and references to at least one functional unit encompassed by the conveying system, which references are linked to each instant or time segment, wherein the recorded signal pattern progression can be compared with an associated reference signal progression by means of the monitoring device, in particular, a comparator included by the monitoring device and optionally implemented in software, and—in the event of deviations between the signal pattern progression and the reference signal progression—a suitable entry in the correlation data set belonging to the reference signal progression can be determined by means of the processing unit on the basis of an instant or time segment of such a deviation, and the functional unit of the conveying system that is referenced there can be output as a cause. The database accommodating the correlation data set may be applied in one embodiment in the memory that also serves to store the signal pattern progression, or may alternatively be placed in its own memory.

An embodiment of the invention shall be described in greater detail hereinbelow, with reference to the drawings. Matters or elements that correspond to one another are provided with the same reference signs in all of the drawings.

The embodiment is not to be understood as limiting the invention. Rather, modifications are also possible within the scope of the present disclosure, in particular those which can be inferred by a person skilled in the art with respect to solving the problem, for example, by combining or modifying individual features, elements, or method steps described in connection with the general or specific description part and contained in the drawings, and lead to a new subject matter or new method steps or method step sequences through combinable features.

DETAILED DESCRIPTION

Figure 1:
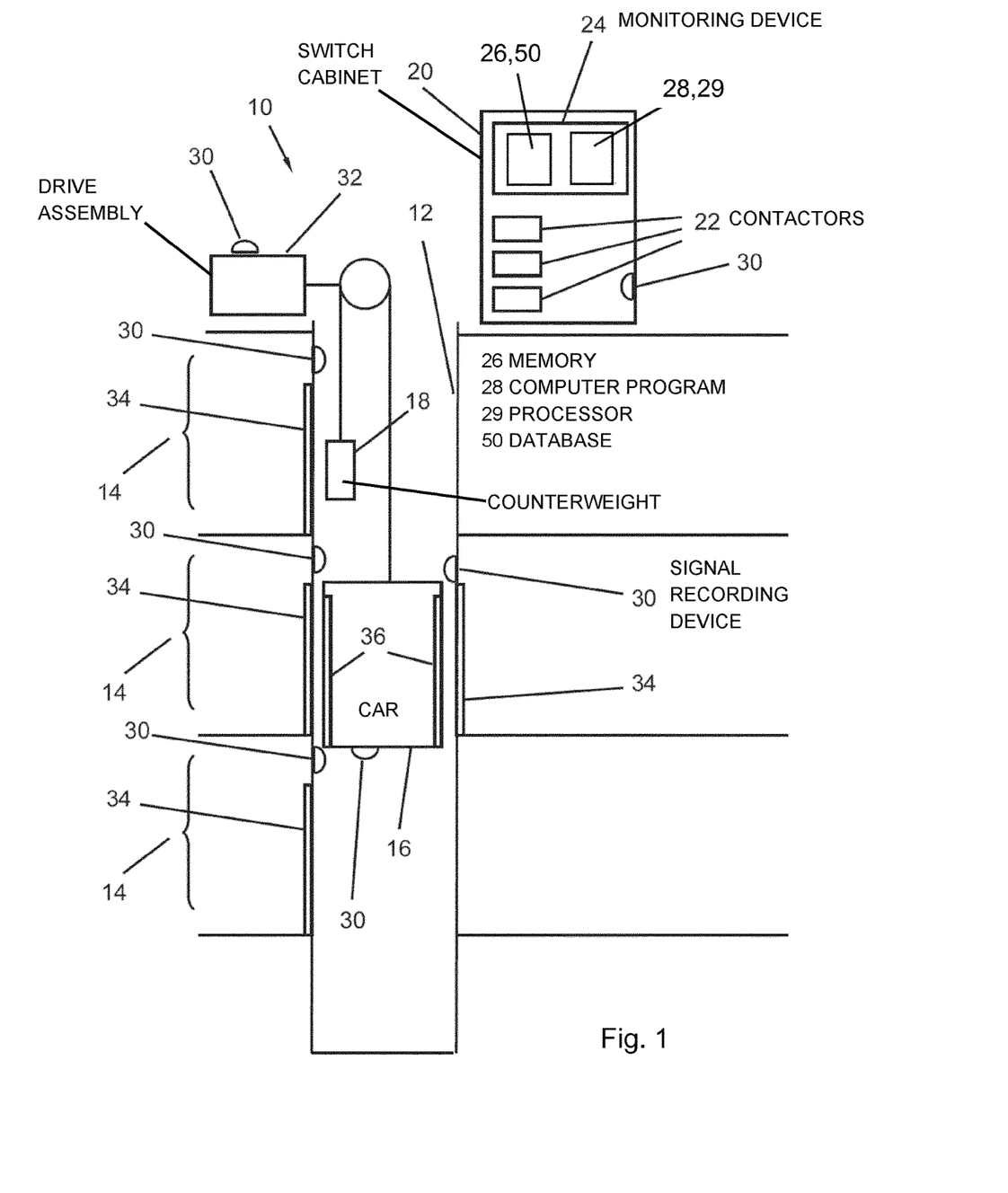
FIG. 1 illustrates an elevator system.

The depiction in FIG. 1 shows a schematically simplified form of an example of conveying system 10, which is a basically known elevator system having an elevator car 16 that is able to move in an elevator shaft 12 between individual floors 14 or other holding positions of a building, as well as a counterweight 18 that is moved jointly therewith when the elevator car 16 moves. Although the elevator system in the drawings is illustrated with only one elevator car 16, the invention may just as easily be considered for more complex elevator systems having a plurality of elevator shafts 12 and/or a plurality of elevator cars 16. Other examples of conveying systems 10 to which the description presented here refers include an escalator, a moving walkway, or the like (not shown).

A switch cabinet 20 having, for example, switch or drive contactors 22 and an associated control device provided in order to control and/or monitor the conveying system 10. The control device may, in a known manner, comprise a microprocessor or the like. The control device governs and controls the conveying system 10. Also arranged in the switch cabinet 20 is a monitoring device 24 having at least one memory 26 and a processor 29. The memory 26 includes a database 50, and the processor 29 is configured in order to execute a computer program 28. The monitoring device 24 with memory 26 and processor 29 may, if need be, also be provided as a control device for controlling the conveying system 10, or the monitoring device 24 with memory 26 and processor 29 and the control device for controlling the conveying system 10 may be combined together.

At least one signal recording device 30, e.g., a signal recording device 30 in the form of a microphone 30, is placed within the conveying system 10. The following description, in the interest of better readability thereof, is continued generally with reference made to one or more microphones 30 as an example of signal recording devices 30, though without waiving any further general validity. Thus, each mention of the term "microphone" may be read as "signal recording device, e.g., signal recording device in the form of a microphone". Other examples of signal recording devices 30 are sensors by means of which vibrations or so-called structure-borne sound of a part of the conveying system 10 can be captured. Both parts of the construction of the system 10, i.e., for example, supports, struts, and the like, as well as assemblies or other functional units of the system 10, i.e., for example, a drive assembly 32, a braking device, an electrical device, and the like are understood to be part of the conveying system 10.

With a conveying system 10 in the form of an elevator system, it would be conceivable to spatially assign, for example, a microphone 30 to a drive assembly 32. Another microphone 30 may be installed, for example, at the bottom of the elevator car 16. Other microphones 30 may be assigned to so-called landing doors and car doors 34, 36, and are assigned thereto in the example depicted. Alternatively or in addition, yet another microphone 30 may be spatially assigned to the switch cabinet 20 and the electromechanical switch elements there, e.g., the aforementioned drive contactors 22, and is assigned thereto in the example depicted.

Figure 2:
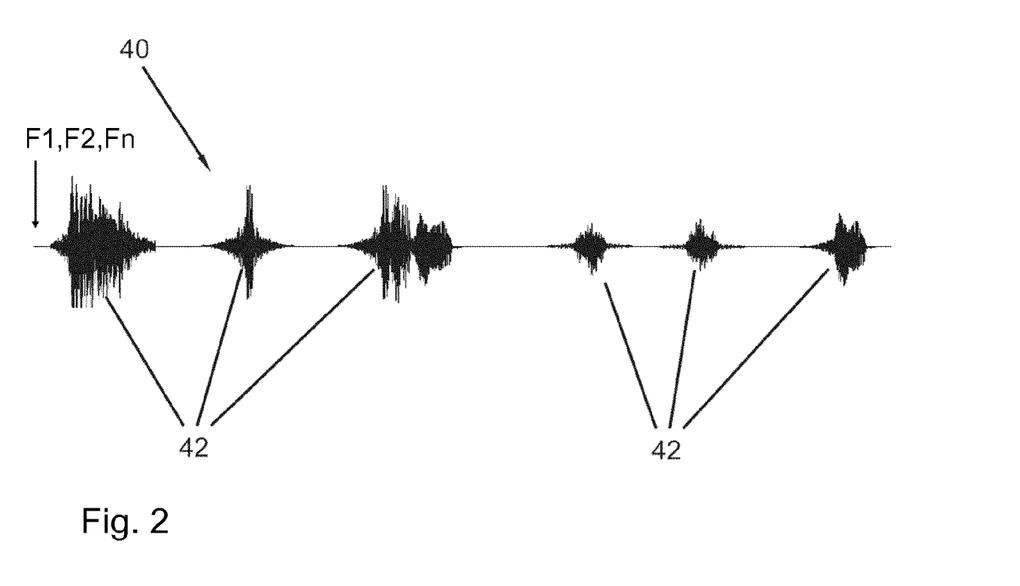
FIG. 2 illustrates a signal pattern progression, for example, a signal pattern progression in the form of a sound pattern progression going back to a noise or a plurality of noises.

By means of each microphone 30 or another signal recording device 30, a noise occurring during operation of the conveying system 10, a vibration occurring during operation of the conveying system 10, or the like can be recorded during operation of the conveying system 10. The recorded noise or signal is transmitted in a basically known manner to wired or wireless paths, for example, within the conveying system 10 to the monitoring device 24, and stored there in digitalized form in the memory 26. The monitoring device 24 executes the method proposed here. The data stored so far is referred to hereinbelow as a sound pattern progression or generally as a signal pattern progression 40, and the illustration in FIG. 2 shows an example of a conventional representation of a possible sound pattern progression, in which the time is plotted on the vertical axis and the so-called sound pressure is plotted on the horizontal axis.

The exemplary signal pattern progression 40 allows for detection of various temporally successive signal events 42, i.e., for example, sound events. A signal pattern progression 40 with distinguishable signal or sound events 42 results on various occasions in the operation of an elevator system or any other conveying system 10, i.e., for example, on opening and closing of the landing and car doors 34, 36, on movement of the elevator car 16 in the elevator shaft 12, on switching of mechanical switching elements in the switch cabinet 20, in particular on switching of drive contactors 22 located there, etc.

Each signal pattern progression 40 is recorded by means of a microphone 30 or another signal recording device 30, for example, under to control of the monitoring device 24 and predetermined or predeterminable instants Fn. Consequently, a signal pattern progression 40 recorded by means of a microphone 30 assigned to a landing door 34 is recorded, for example, no later than a first movement F1 of the landing door 34 or on approach of the elevator car 16 to a holding position in the respective floor 14, or on a start command F2 to execute an elevator trip or the like. The essential point is that a signal pattern progression 40 recorded by means of a specific microphone 30 is always recorded at the same instants F1, F2, Fn related to the operation of the conveying system 10. In principle, a plurality of signal pattern progression 40 can also be recorded at different instants F1, F2, Fn relating to the operation of the conveying system 10 by means of a microphone 30, but the resulting signal pattern progressions 40 are then preferably each handled as stand-alone signal pattern progressions 40 and not as a connected signal pattern progression 40.

The recording of a signal pattern progression 40 in operation of the conveying system 10 is prompted, for example, automatically by the monitoring device 24 by recording of a current signal pattern progression 40 in the above-mentioned manner at an instant F1, F2, Fn related to the operation of the conveying system 10. Alternatively, it may also be provided that the recording of a signal pattern progression 40 is triggered only every second, third, or fourth time (and so forth) that the instant F1, F2, Fn related to the operation of the conveying system 10 occurs. A signal pattern progression 40 is also usually evaluated in the manner described below automatically by the monitoring device 24, following the recording of the signal pattern progression 40. Alternatively, it may also be provided that a recorded signal pattern progression 40 is first stored and only assessed at a later instant, e.g., by means of a mobile or external device.

Figure 3:
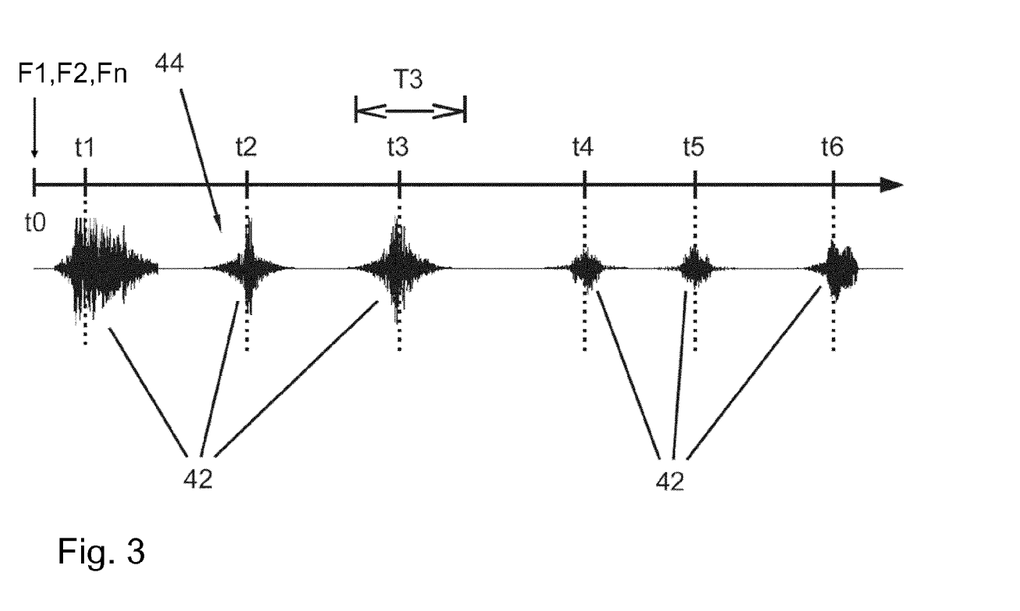
FIG. 3 illustrates a reference signal progression used for qualitatively or quantitatively assessing a signal pattern progression.

The depiction in FIG. 3 illustrates a reference signal pattern progression (reference signal progression) 44 associated with the exemplary signal pattern progression 40 according to FIG. 2. The reference signal progression 44, too, comprises a plurality of recognizable signal events 42. The reference signal progression 44 is, like the signal pattern progression 40, recorded at a defined instant F1, F2, Fn related to the operation of the conveying system 10, when the monitoring is installed and activated and the conveying system 10 is in a faultless state. The respective instant sets forth the instant at which a respectively current signal pattern progression 40 is recorded later in the operation of the conveying system 10. The same underlying start instants F1, F2, Fn make it possible to compare the reference signal progression 44 and a signal pattern progression 40 that is recorded later. The reference signal progression 44 thus functions as a basis for an assessment of a signal pattern progression 40 that is recorded in the operation of the conveying system 10. The evaluation takes place in one embodiment of the invention proposed here by means of the monitoring device 24 and by means of a comparator 46 (FIG. 6) loaded into the memory 26 as a component of the computer program 28 and implemented in software, i.e., a comparison algorithm. Execution of the computer program 28 by means of the respective processing unit of the monitoring device 24 or another corresponding device, for example, a mobile device 24a or a device not located at the location of the conveying system 10 automatically results in the comparison and the evaluation—described in greater detail hereinbelow—of a signal pattern progression 40 by means of the respective processing unit.

Accordingly, at least one reference signal progression 44 is associated with each signal pattern progression 40, and the reference signal progression 44 is recorded during operation of the conveying system 10 with exactly that microphone 30 at the respective predetermined or predeterminable instant F1, F2, Fn, with/at which an instantaneous signal pattern progression 40 is subsequently recorded in further operation of the conveying system 10.

Figure 4:
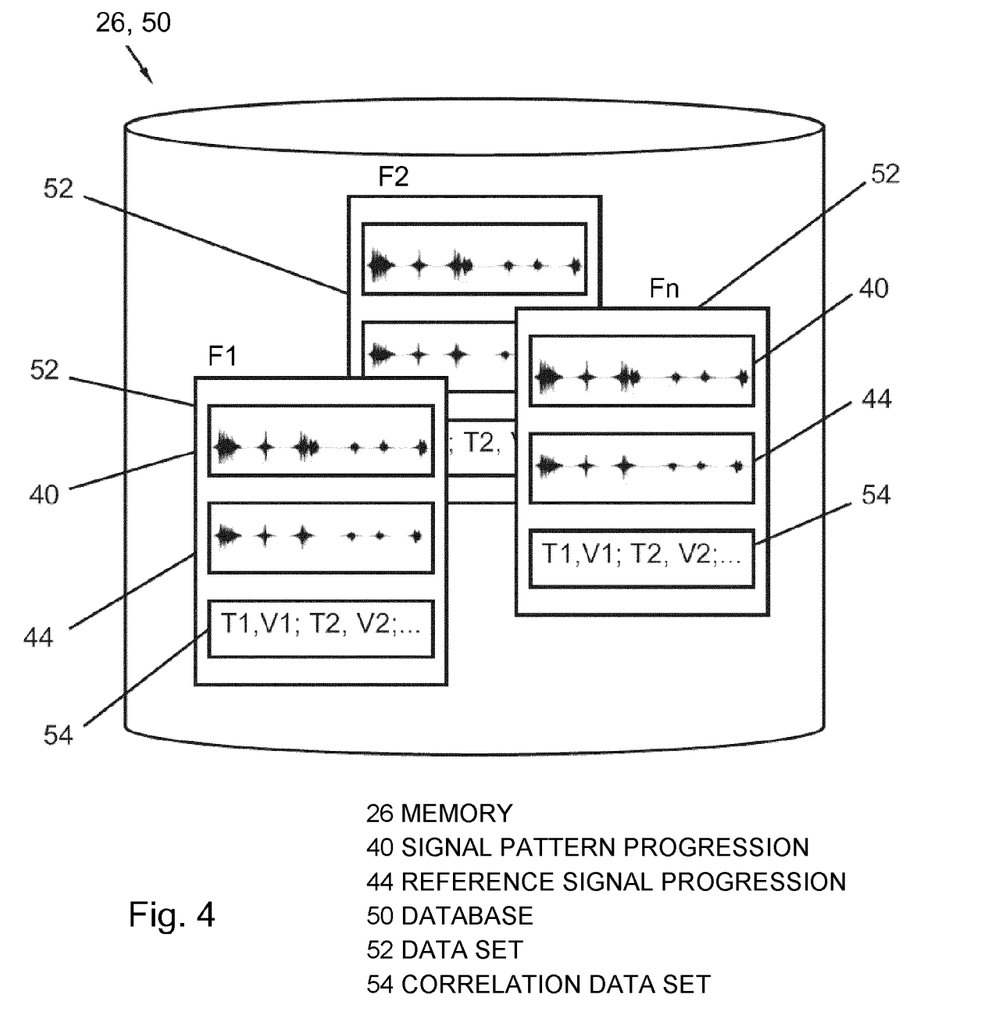
FIG. 4 illustrates a database having a plurality of signal pattern progressions and/or reference signal progressions stored there.

The representation in FIG. 4 illustrates this assignment of each signal pattern progression 40 to at least one reference signal progression 44 in yet another way. A database 50 loaded, for example, in the memory 26 or in a remote memory which can be reached in a conventional manner by the monitoring device 24 is illustrated. This database 50 furthermore stores one or more reference signal progressions 44 and associated signal pattern progressions 40, namely, in a manner that permits automatic recognition of association, for example by combining a reference signal progression 44 and an associated signal pattern progression 40 in a data set 52. Other possibilities for recognizable cohesiveness of such data are also conceivable, for example, a representation of the association by means of direct or indirect references, in particular, a so-called pointer, which correlate with the instants F1, F2, Fn.

A recorded signal pattern progression 40 is compared with a respectively associated reference signal progression 44, for example by means of the monitoring device 24, on the basis of the already mentioned signal events 42 as well as instants or time segments at which such signal events 42 are expected. Reference is therefore made yet again to FIG. 3. FIG. 3 illustrates, by way of example, a reference signal progression 44 and signal events 42 that are encompassed thereby and are consecutive in time to one another. An instant F1, F2, Fn, i.e., a start instant or a characteristic instant t1, t2, t3, t4, t5, and t6 or a time span T1, T2, or the like can be assigned to each of the signal events 42 (of which there are six here)—relative to a start instant/start point t0 of the recording of the reference signal progression 44. The stated instants t1 to t6 are entered in the depiction in FIG. 3 for illustrative purposes, as examples of instants that are relevant here. An additional entry of all time spans T1 to T6 is omitted in the interest of clarity of presentation in favor of the representation of a time span T3.

Each signal event 42 is linked with one or more functional unit(s) of the conveying system which is responsible for the signal event 42—here and hereinafter referred to as the cause. If, for example, in the switch cabinet 20, one of the switch contactor 22 drops or picks up, the result is a noise/signal event 42 detectable by means of the microphone 30 in the switch cabinet 20. The signal event 42 or plurality of signal events 42 in the case of a plurality of successive switching operations of a switch contactor 22 or of a group of switch contactor 22 is or are therefore part of a reference signal progression 44 recorded in the switch cabinet 20 and also a signal pattern progression 40 recorded later in the switch cabinet 20. After it is known at which instant, for example, which switch contactor 22 performs a switching operation, each signal event 42 can be assigned to a switch contactor 22 as a cause and a respective switching operation. The fact that such instants are known results from the fact that the switching operations of the switch contactors 22 or other switching elements are the cause of individual concrete procedures during operation of the respective conveying system 10 and accordingly the sequence of switching operations of the individual switch contactors 22 is based on a realized functionality of the conveying system 10, for example, functionality such as opening or closing doors 34, 36, starting the elevator car 16 after a floor stop, braking and positioning the elevator car 16 in connection with a floor stop, etc. Examples of signal events 42 outside of the switch cabinet 20, i.e., for example, signal events 42, which can be recorded during operation of an elevator system on a car door 36 of an elevator car 16, are movement and contact noises of mechanical components such as, for example, the touch contact of the so-called sword of a car door 36 and the locking rollers of the associated landing door 34 in the process of door opening and closing, bearing noise of the so-called hook bolt, noise in connection with a subsequent venting or closing of the door contacts and the subsequent door opening and closing with rolling noise of the door leaves and possible grinding noise of the door guides. The functional units mentioned as well as other functional units, which are not mentioned and which are usually used in a conveying system 10, in particular an elevator system, can also be considered as the cause of a signal event 42. Even with such causes, the instants and/or time segments at which corresponding signal events 42 are expected are basically known for the same reasons as explained above in the example of the switch contactors 22. Accordingly, in a reference signal progression 44 and in a later-recorded signal pattern progression 40, each signal event 42 can be assigned to a functional unit/a cause or, especially for simultaneous or temporally overlapping signal events 42, at least one group of functional units/causes.

The mentioned instants or time spans are stored in a respective correlation data set 54 (FIG. 4). The illustration in FIG. 4 schematically shows, in simplified form, such correlation data sets 54 as data stored in the database 50. The instants or time segments encompassed by each correlation data set 54, as well as the causes from which a signal event 42 detected at such instants or time periods originates, are symbolically represented as "T1, V1; T2, V2; . . . ". Each correlation data set 54 is assigned to exactly one data set 52 and there at least one reference signal progression 44, and the instants or time segments of the correlation data set 54 relate to the signal events 42 of the respective reference signal progression 44. Each data set 52 is thus assigned to a functional sequence which is identified, for example, by a start instant F1, F2, Fn.

Figure 5:
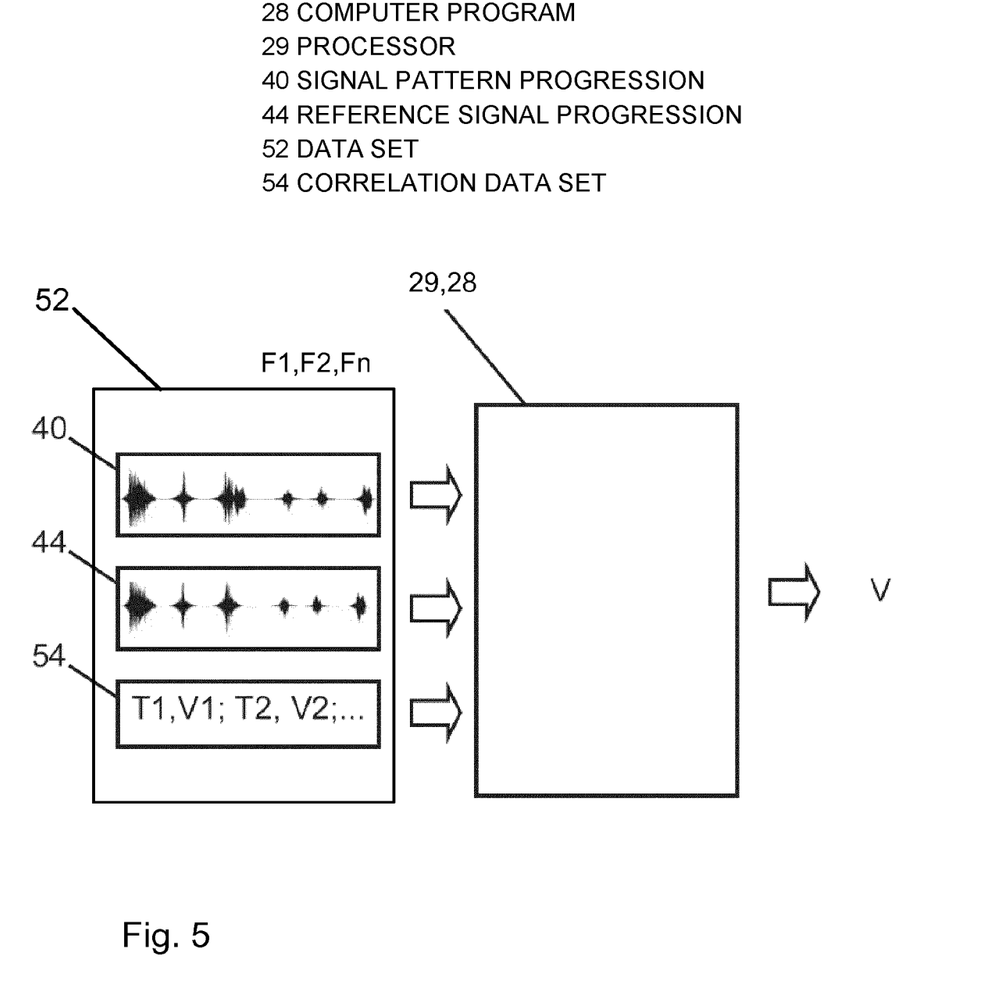
FIG. 5 illustrates a comparator for comparing a signal pattern progression with an associated reference signal progression.

The illustration in FIG. 5 shows a schematically simplified illustration of a processor 29 with a comparison algorithm implemented in software, in particular as a component of the computer program 28. The computer program 28 in each case processes at least one reference signal progression 44, a later-recorded, associated signal pattern progression 40, and a correlation data set 54 belonging to the reference signal progression 44. The comparison performed by the computer program 28 initially relates only to the at least one respective reference signal progression 44 and the signal pattern progression 40. At least when the computer program 28 detects differences, access is made to the correlation data set 54 i.e., for the instant or time segment to which the detected difference belongs. Based on the cause stored in the correlation data set 54 for each instant or time segment detected there, it can be output as the reason for the detected deviation between the reference signal progression 44 and the signal pattern progression 40 (shown in the illustration on the output side of the processor 29 as the cause V output as an output signal).

In the case of a plurality of reference signal progressions 44 based on a comparison, these can be combined, for example, by averaging or other statistical functions. Additionally or alternatively, a trend can be derived from a plurality of reference signal progressions 44. Additional reference signal progressions 44 may be obtained by recording a recorded signal pattern progression 40 into the respective data set 52 after completion of the evaluation thereof as another reference signal progression 44. For a particularly robust trend analysis, it is optionally provided that each signal pattern progression and reference signal progression 40, 44 is provided with a timestamp and recognizable time intervals in the comparison and/or the trend analysis are based on this.

The further description is continued—without dispensing with a more general universality—using the example of a comparison of a signal pattern progression 40 with an underlying reference signal progression 44.

The computer program 28 compares the reference signal progression 44 and the signal pattern progression 40, for example, with regard to a mean or maximum amplitude of a signal event 42 and/or with respect to a duration of a signal event 42. The amplitude comparison is optionally based on predetermined or predeterminable threshold values, so that only an overshoot or undershoot by more than the threshold value is evaluated as a deviation. Additionally or alternatively, with regard to a duration of a signal event 42, such threshold values are optionally also used, such that only an exceeding of a threshold value is evaluated as the beginning and a subsequent undershooting of the same or another threshold value is evaluated as the end of the signal event 42. A further threshold value can be used in such a way that the beginning of a signal event 42 is detected only when the first threshold value is exceeded during a duration specified by the further threshold value (the same applies correspondingly to the detection of the end of the signal event 42). A further or alternative possibility for comparing the reference signal progression 44 and the signal pattern progression 40 consists of a consideration of the respective frequencies contained in the signal event 42. Again, thresholds can be used in the manner described above. Furthermore, statistical quantities such as mean values, for example amplitude mean values or frequency mean values, standard deviations, etc., can be used in the comparative evaluation of a signal pattern progression 40 and an associated reference signal progression 44.

The assignment of a comparison result determined on this or a similar basis, in particular a detected deviation, to an instant or time segment of the correlation data set 54 and a cause associated therewith takes place, for example, by starting a counter 56 with the start of the comparison by the computer program 28 (FIG. 6) or the like, and this is periodically incremented, so that at the end of the comparison, i.e. when the end of the signal pattern progression 40 and the reference signal progression 44 is reached, a time/numerical value corresponding to the duration of the signal progressions 40, 44 is obtained. Then, the current counter state upon detection of a deviation can be used for accessing the correlation data set 54, so that by means of the counter, a suitable time span T1 to T6, specified in the correlation data set 54, i.e., a suitable entry of the correlation data set 54, is selected. The or each time span thus selected in the correlation data set 54 of assigned causes—here designated with V1 to V6, symbolically corresponding to the number of signal events 42 (six) that are distinguishable in the depictions in FIGS. 3 and 4—is then outputted as the cause of the detected deviation, here as the cause V3 assigned to the time span T3.

Figure 6:
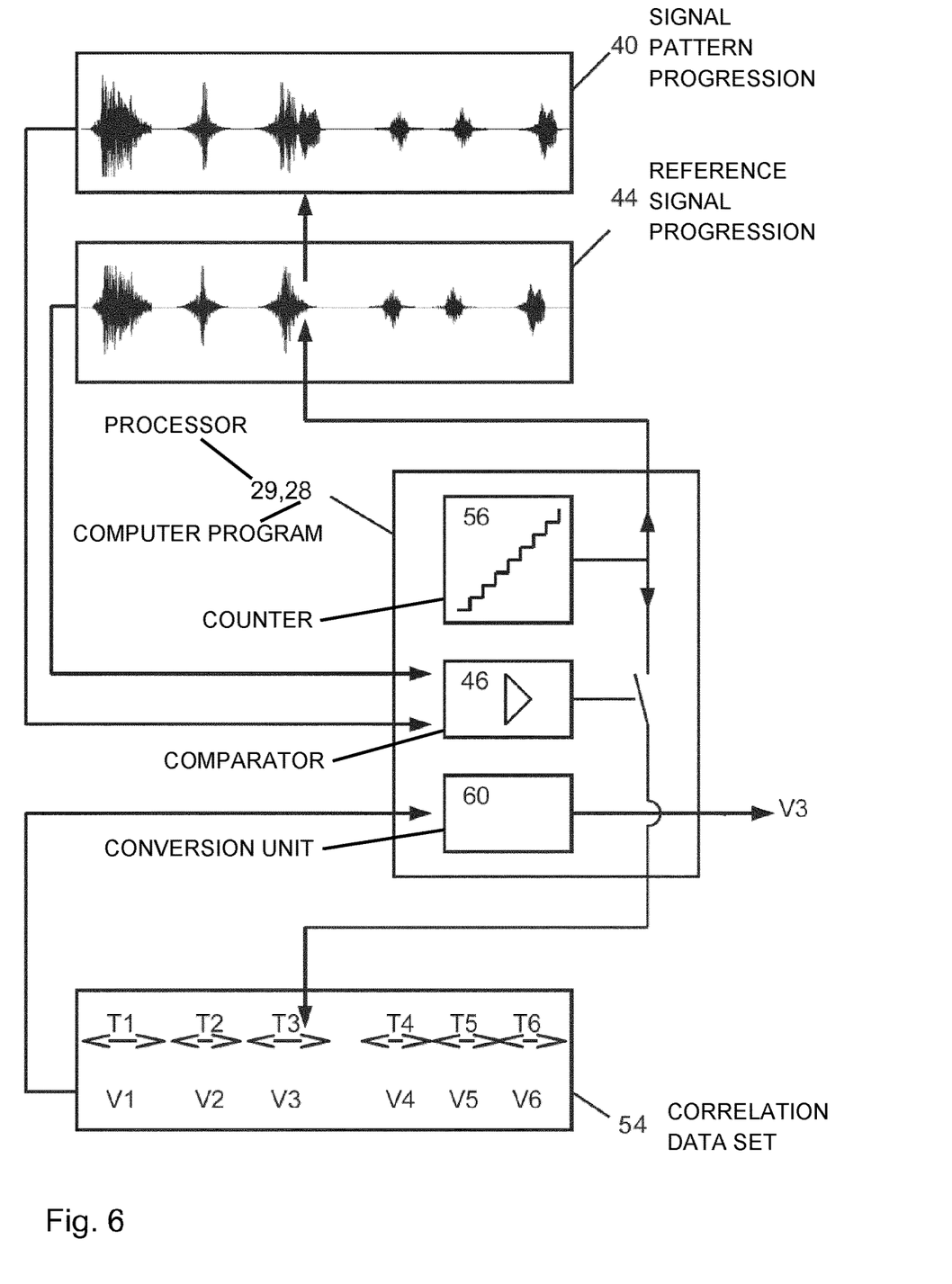
FIG. 6 illustrates the comparator according to FIG. 5, with other details by way of example.

The depiction in FIG. 6 illustrates the situation according to FIG. 5 with more details in this regard. According thereto, the processor 29 or the implemented computer program 28 includes a comparator 46 and a counter 56. Each current counter reading is used in the manner of an index or cursor for accessing the data of the signal pattern progression 40 and the reference signal progression 44. Alternatively, instead of a counter 56, any other functionality providing such an index may be considered.

In a particularly simple embodiment of a comparison, a numerical value results in each case from such an access on the basis of the signal pattern progression 40 and the reference signal progression 44. These two numerical values can be supplied to a comparator comprised by the comparator 46. If—as is the case in the illustrated example—the numerical value resulting from the signal pattern curve 40 exceeds the corresponding numerical value based on the reference signal curve 44, in particular, exceeds by more than a predefined or predefinable threshold value, the comparator 46 effectively switches the assessment of the correlation data set 54 (illustrated in a schematically simplified manner in the depiction in FIG. 6, in the form of a switch that can be controlled by the comparator 46). With the respective current counter reading, the correlation data set 54 is accessed, and it results there that the counter reading falls within the time segment T3. Consequently, the cause associated with this time segment, here symbolically designated V3, is selected and outputted as an output signal. For processing of the data selected in this way from the correlation data set 54, namely, the data for respective causes V1 to V6 referenced there, the computer program 28 may comprise a conversion unit 60, which converts, for example, information that is relevant to referencing a cause V1 to V6 in the correlation data set 54 into a readable and understandable plain text, so that, for example, a text message such as "relay safety circuit" or "landing door, floor 3" results from such information.

The referencing of a cause V1 to V6 in the correlation data set 54 takes place, for example, by means of a numerical value unambiguously identifying same, an address, a short designation, or the like. Of course, the correlation data set 54 may also directly include a text which designates and/or describes the respective cause, or a reference thereto.

Figure 7:
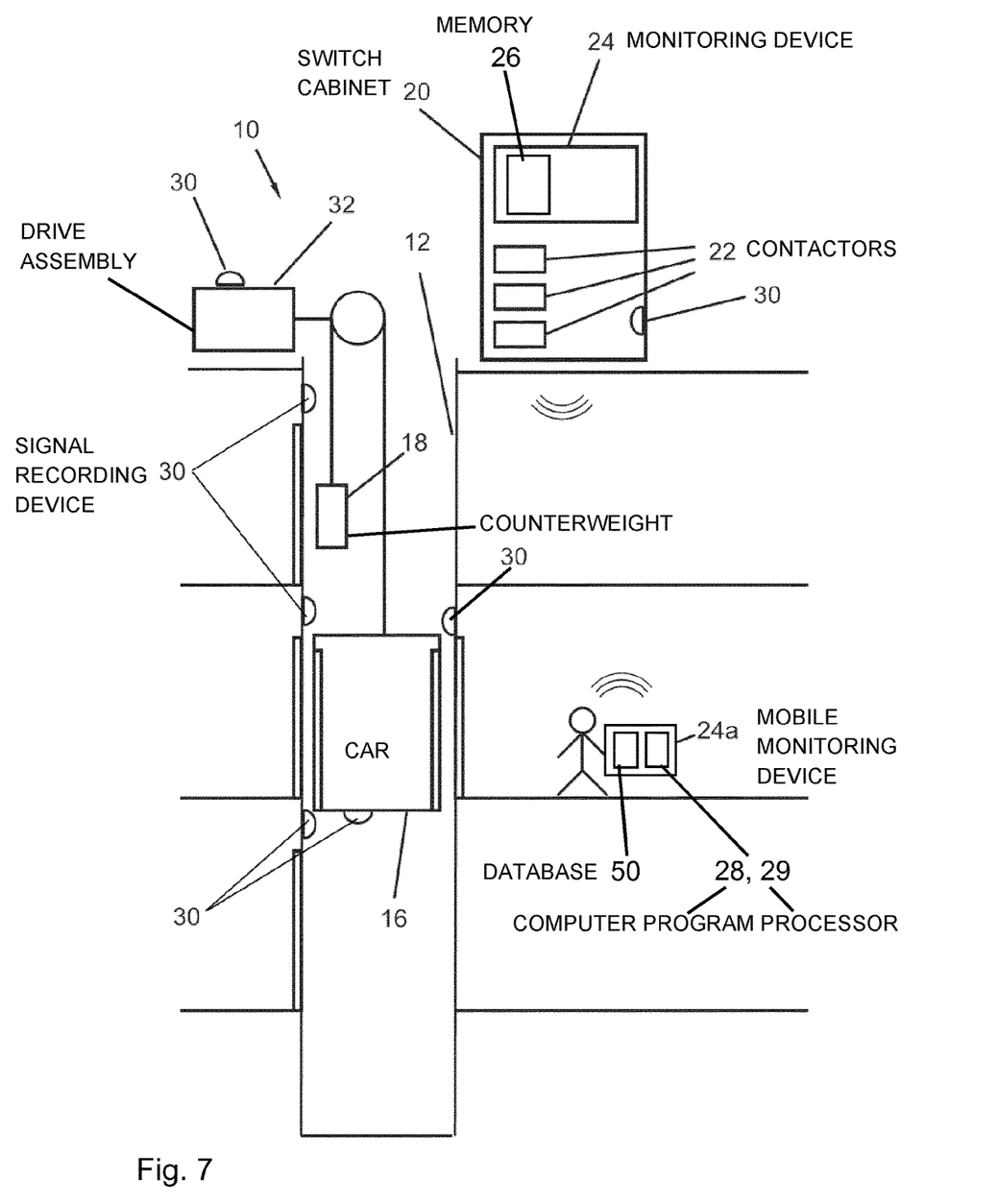
FIG. 7 illustrates the elevator system according to FIG. 1, with a mobile monitoring device.

In contrast to the embodiment according to FIG. 1, the illustration in FIG. 7 illustrates a situation in which a device intended to execute the evaluation of individual or multiple signal pattern progressions 40 and correspondingly functioning as monitoring device 24a is carried by a service technician or a maintenance specialist. The device is, for example, a laptop, a smartphone, a tablet computer, or the like. Such a mobile monitoring device 24a executes—instead of the monitoring device 24 or in addition to the monitoring device 24—the method proposed here and receives therefor, for example, on a wireless path, the necessary data, in particular, a signal pattern progression 40 that is, for example, buffered in the memory 26, from the monitoring device 24 or from one of the signal recording devices 30. The monitoring device 24a includes therefor the required computer program 28 and, in the embodiment depicted, also the database 50 with the reference signal progressions 44 and correlation data sets 54 assigned to the corresponding conveying system. Of course, the database 50 may also be stored in the memory 26 of the conveying system and then transmitted to the mobile monitoring device 24a for assessment.

Instead of the monitoring device 24a, shown in FIG. 7 as a mobile device, or in addition to such a device, a device (not shown), for example a standard computer, may also act as monitoring device 24a at the location of a maintenance center.

Although the invention has been further illustrated and described in detail by the exemplary embodiment, the invention is not limited by the disclosed example(s), and other variations can be derived therefrom by a person skilled in the art without departing from the scope of the invention.

Individual foreground aspects of the description submitted here can be summarized as follows: Disclosed are a method and a device acting as a monitoring device 24, 24a for detecting state changes of conveying systems 10, such as elevator and escalator systems, by means of an, in particular, periodic, discontinuous monitoring independently of the manufacturer of the particular conveying system 10 and of experience or limit values, which can otherwise be used to assess the state of the conveying system 10. In principle, human hearing and related experiences (an altered sound is an indication of an existing or imminent defect) are mimicked. The invention makes use of the fact that the system functionality of a conveying system 10, for example an elevator system, is subjected to exactly coordinated sequences and that these are associated with typical movement and contact sounds or vibrations. If such sequences are not adhered to in terms of the time sequence and duration, this, just like a changing noise, is an indication of an existing or imminent defect. Such changes are detected according to the approach proposed here by means of a comparison of a signal pattern progression 40 with a reference signal progression 44 and can be concretely assigned to a cause by means of the data of an associated correlation data set 54. The invention is thus a method for monitoring a conveying system 10, a monitoring device 24, 24a for performing the method, and a conveying system 10 monitored in accordance with the method and by means of the monitoring device 24, 24a, wherein at least one signal pattern progression 40 is recorded in relation to the conveying system 10, wherein at least one reference signal progression 44 is stored in a database 50, wherein a correlation data set 54 is stored in the database 50 for the or each reference signal progression 44, wherein the correlation data set 54 comprises instants or time segments in the reference signal progression 44 and references to at least one functional unit encompassed by the conveying system 10, which references are linked to each instant or time segment, wherein the recorded signal pattern progression 40 is compared with the reference signal progression 44 by means of a processing unit, and wherein, in the event of deviations between the signal pattern progression 40 and the reference signal progression 44, a suitable entry in the correlation data set 54 belonging to the reference signal progression 44 is determined by means of the processing unit on the basis of an instant or time segment of such a deviation, and the functional unit referenced there is output as a cause.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for monitoring a conveying system comprising the steps of:
   recording a signal pattern progression in relation to operation of the conveying system using a signal recording device placed within the conveying system;
   storing a reference signal progression in a database;
   storing in the database a correlation data set for the reference signal progression, the correlation data set including instants or time segments in the reference signal progression and references to a functional unit of the conveying system, which references are linked to each instant or time segment;
   transmitting the recorded signal pattern progression to a monitoring device and comparing the recorded signal pattern progression with the reference signal progression using a processor in the monitoring device executing a computer program;
   wherein, in response to at least one deviation between the signal pattern progression and the reference signal progression, the monitoring device determines an entry in the correlation data set on a basis of the instant or time segment corresponding to the at least one deviation, and the monitoring device outputs as an output signal an indication of the referenced functional unit linked to the corresponding instant or time segment as a cause of the at least one deviation; and wherein at least one rate of change of the signal pattern progression at at least one instant or time segment of the signal pattern progression is determined from the comparison of the recorded signal pattern progression and the reference signal progression.

2. The monitoring method according to claim 1 including recording the signal pattern progression at predetermined or predeterminable instants, performing the comparison of the signal pattern progression with the reference signal progression and, in response to the at least one deviation, outputting the output signal indication of the referenced functional unit as the cause at the predetermined or predeterminable instants.

3. The monitoring method according to claim 2 including receiving the signal pattern progression at the monitoring device at the instants in response to at least one of an event in the operation of the conveying system, a state of the conveying system, and an external retrieval by the monitoring device.

4. The monitoring method according to claim 1 including recording the signal pattern progression at predetermined or predeterminable instants, performing the comparison of the signal pattern progression with the reference signal progression, and in response to the at least one deviation, outputting the output signal indication of the referenced functional unit as the cause synchronously or asynchronously to the recording of the signal pattern progression.

5. The monitoring method according to claim 4 including receiving the signal pattern progression at the monitoring device at the instants in response to at least one of an event in the operation of the conveying system, a state of the conveying system, and an external retrieval by the monitoring device.

6. The monitoring method according to claim 1 including transmitting the recorded signal pattern progression to the monitoring device being a mobile device or device at a location remote from a location of the conveying system.

7. The monitoring method according to claim 6 wherein the signal pattern progression is transmitted in response to an external retrieval or in a time-controlled manner.

8. The monitoring method according to claim 6 wherein the signal pattern progression is transmitted synchronously or asynchronously to the recording of the signal pattern progression.

9. The monitoring method according to claim 1 wherein the at least one rate of change is evaluated in relation to a predetermined or predeterminable limit value, and wherein, if the limit value is exceeded, the associated instant or time segment is set forth and the indication of the functional unit assigned to this instant or time segment in the associated correlation data set is outputted as the cause.

10. The monitoring method according to claim 1 including storing the signal pattern progression as an additional reference signal progression, and determining at least one additional rate of change of the signal pattern progression at the at least one instant or time segment of the signal pattern progression by a comparison of a newly-recorded signal pattern progression with the additional reference signal progression.

11. The monitoring method according to claim 10 wherein the at least one additional rate of change is evaluated in relation to a predetermined or predeterminable limit value, and wherein, if the limit value is exceeded, the associated instant or time segment is set forth and the indication of the functional unit assigned to this instant or time segment in the associated correlation data set is outputted as the cause.

12. The monitoring method according to claim 1 including recording a sound pattern progression or a chronological progression of vibrations or structure-borne sound as the signal pattern progression.

13. A computer program product with program code means for performing the method according to claim 1 when loaded into a processor of the monitoring device as the computer program.

14. A monitoring device for monitoring a conveying system comprising:
 a memory storing a recorded signal pattern progression in relation to operation of the conveying system;
 a database storing at least one reference signal progression and a correlation data set, wherein the correlation data set includes instants or time segments in the at least one reference signal progression and references to at least one functional unit of the conveying system, the references being linked to the instants or the time segments; and
 a processor executing a computer program to
  compare the recorded signal pattern progression with the at least one reference signal progression,
  identify a deviation between the signal pattern progression and the at least one reference signal progression and determine an instant or time segment of the deviation,
  determine a suitable entry based on the determined instant or time segment in the correlation data set belonging to the reference signal progression and output an indication of the at least one functional unit of the conveying system that corresponds to the entry as a cause of the deviation, and
  determine at least one rate of change of the signal pattern progression at at least one instant or time segment of the signal pattern progression from the comparison of the recorded signal pattern progression and the reference signal progression.

15. A conveying system with at least one signal recording device for recording a signal pattern progression in relation to operation of the conveying system and a monitoring device according to claim 14 for receiving the signal pattern progression.

* * * * *